Figures 1, 2:
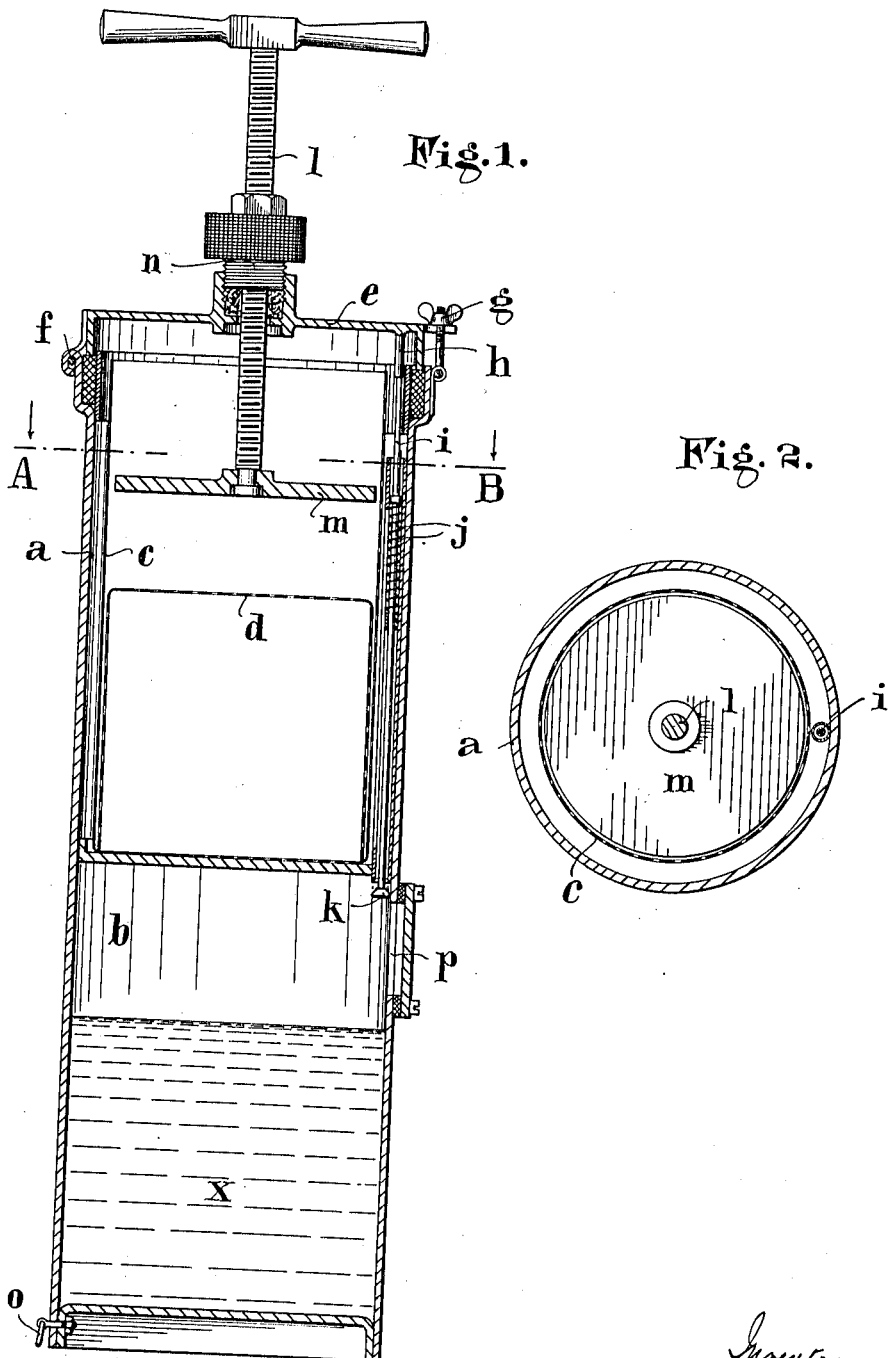

A. HENNING.
APPARATUS FOR CLEANING VARIOUS MATERIALS.
APPLICATION FILED DEC. 16, 1911.

1,035,876. Patented Aug. 20, 1912.

UNITED STATES PATENT OFFICE.

ALBERT HENNING, OF LEYTONSTONE, ENGLAND.

APPARATUS FOR CLEANING VARIOUS MATERIALS.

1,035,876.  Specification of Letters Patent.  Patented Aug. 20, 1912.

Application filed December 16, 1911. Serial No. 666,295.

*To all whom it may concern:*

Be it known that I, ALBERT HENNING, a subject of His Majesty the King of England, and resident of 92 Harrow road, Leytonstone, Essex, England, have invented a certain new and useful Improved Device or Apparatus for Cleaning Various Materials, of which the following is a specification, such as will enable others skilled in the art to which it appertains to make and use the same.

This invention relates to an improved apparatus for cleaning materials particularly fabrics and while particularly designed for home use it can be advantageously used commercially.

The invention may be broadly described as consisting of a receptacle of that kind which is divided into separate chambers preferably two, into one of which the cleaning liquid, for example benzin, is placed while the other receives the articles to be cleaned, In my apparatus a passage is formed from one chamber to the other and is adapted to be closed by a valve operated by the opening and closing of a cover, the arrangement being such that the closing of the cover opens the valve and the removal or opening of the cover closes the valve. I preferably form the apparatus with cylindrical chambers superposed and furnish the upper one with a closely fitting hinged cover adapted to move a spindle valve controlling the passage from one chamber to the other. The articles to be cleaned are placed in the upper chamber preferably in a removable perforated holder (which may have a false bottom) and the cover is preferably fitted with a screwed spindle upon the inner end of which a pressing plate or disk is fitted the arrangement being such that upon turning the screwed spindle the disk will press fluid from the articles after they are cleaned and thus enable them to be removed and practically all of the fluid extracted, the said fluid returning by gravity to the lower chamber which is instantly closed to the top chamber upon the opening of the cover.

I will now describe my invention with reference to the accompanying drawings, in which—

Figure 1. is a sectional view of a simple form of the apparatus. Fig. 2. is a sectional view about the line A—B of Fig. 1. with the presser lowered.

*a* and *b* are respectively the upper and lower chambers. A perforated holder *c* is shown in the chamber *a* and in it is a removable false bottom *d*. A cover *e* hinged at *f* is fitted to the top of the chamber *a* and secured thereto by pivoted bolts and nuts *g*. On the underside of this cover is a projection *h* adapted when the lid is closed down, to depress the spring controlled rod *i* to the lower end of which a valve *k* is fitted. The spring *j* around this rod tends to lift it upwardly and keep the valve *k* closed except when the cover is closed and screwed down. It will thus be seen that immediately the cover is closed the valve is opened and the liquid in the compartment *b* will when the device is upturned enter the compartment *a* and thoroughly saturate anything therein. A screwed spindle *l* is passed through the stuffing box *n* of the cover and has on its lower end a pressing plate *n* which fitting within the perforated holder *c* can be caused to tightly compress anything placed therein, the false bottom *d* being used when articles of small bulk only are to be cleaned. An inlet is made to the lower chamber and is covered by plate *p* through which access can be had to the valve *k* when required.

A ring *o* is shown by which the article can be suspended in inverted position.

The apparatus is used substantially as follows:—The cleaning liquid having been placed in the lower chamber the articles to be cleaned are placed in the perforated holder *c* with or without the false bottom *d*. The cover is closed down and thus opens communication between the two chambers at the valve *k* and the apparatus is then inverted, agitated or revolved so that the cleaning liquid enters the top chamber and thoroughly cleans any articles placed therein. After this when the apparatus is restored to upright position the plate *n* is pressed downwardly upon the articles and thoroughly squeezes or wrings the same, the liquid passing automatically to the lower chamber. The cover is then opened and the articles are taken out cleaned and practically free from liquid. The same process can be gone through again with the same liquid additions being made to the liquid as and when required.

What I claim and desire to secure by Letters Patent is:—

1. Apparatus for cleaning fabric and the like comprising a two chambered receptacle, a valve between the chambers of the receptacle and a pressing plate in one receptacle which receptacle also has a cover.

2. Apparatus for cleaning fabric and the like comprising a two chambered receptacle, a valve between the chambers of the receptacle and a pressing plate in one receptacle which receptacle also has a cover, the said valve being automatically opened when the cover is closed.

3. Apparatus for cleaning fabric and the like comprising a cylindrical vessel divided into two superposed compartments normally closed to one another, with a valve between them which is opened by a cover on the upper compartment when it is closed, a perforated or the like holder with a removable false bottom in the upper compartment, and a pressing plate on a screwthreaded spindle passed through the cover.

In witness whereof I have hereunto set my hand in the presence of two witnesses.

ALBERT HENNING.

Witnesses:
O. P. LIDDON,
O. J. WORTH.